April 7, 1964     A. J. QUICK ETAL     3,127,795
BORING APPARATUS AND SPLIT-CASING WORKPIECE THEREFOR
Filed Aug. 8, 1960     6 Sheets-Sheet 1

INVENTORS
ADAM J. QUICK
CHARLES A. PORTER
BY
Leonard Bloom
ATTORNEY

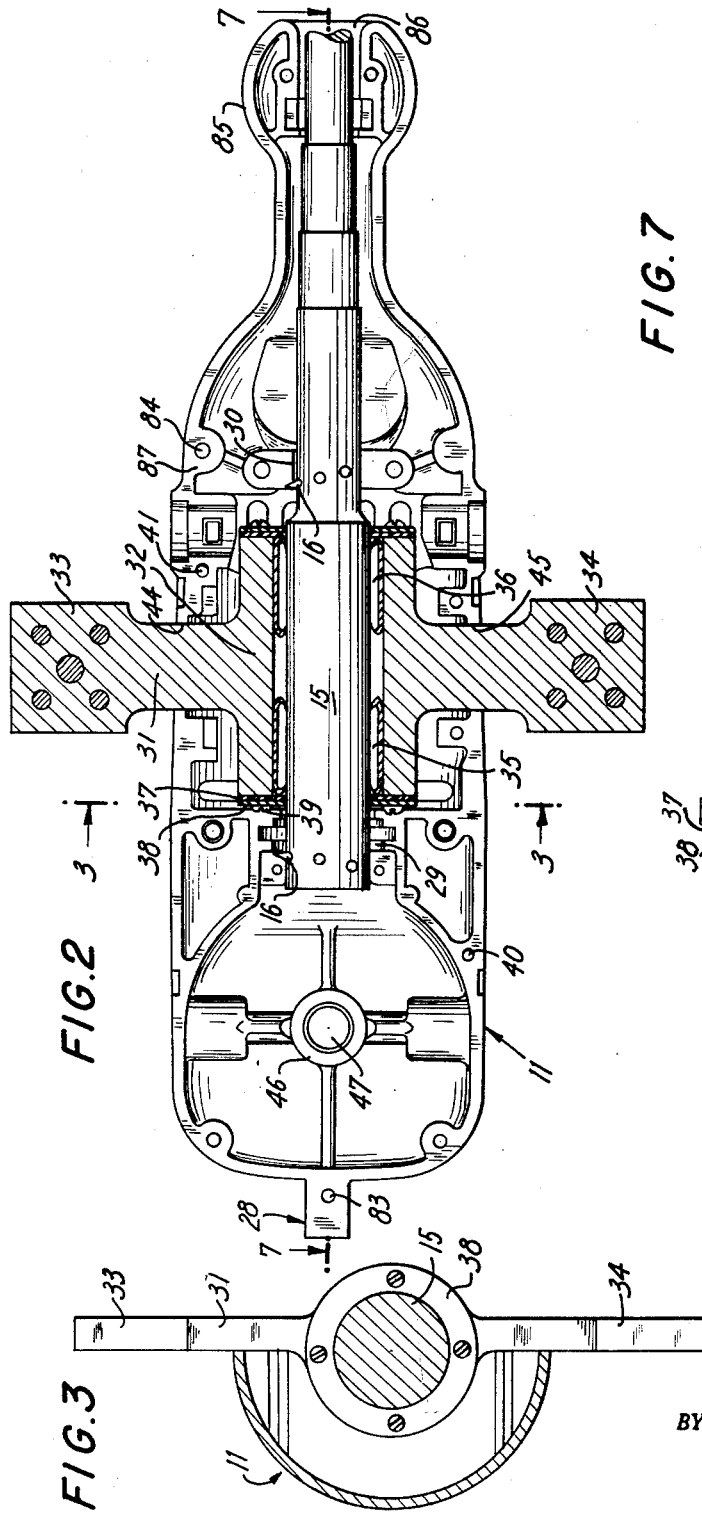
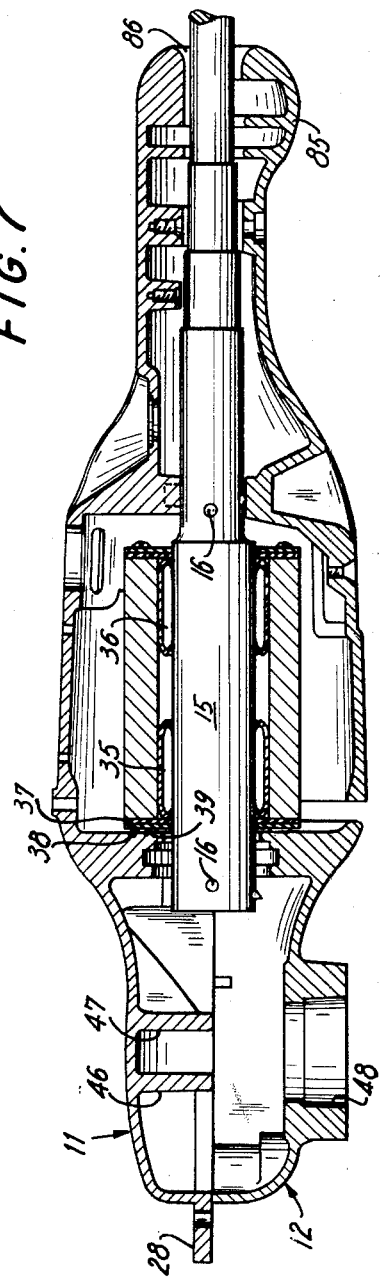
INVENTORS
ADAM J. QUICK
CHARLES A. PORTER
BY
*Leonard Bloom*
ATTORNEY

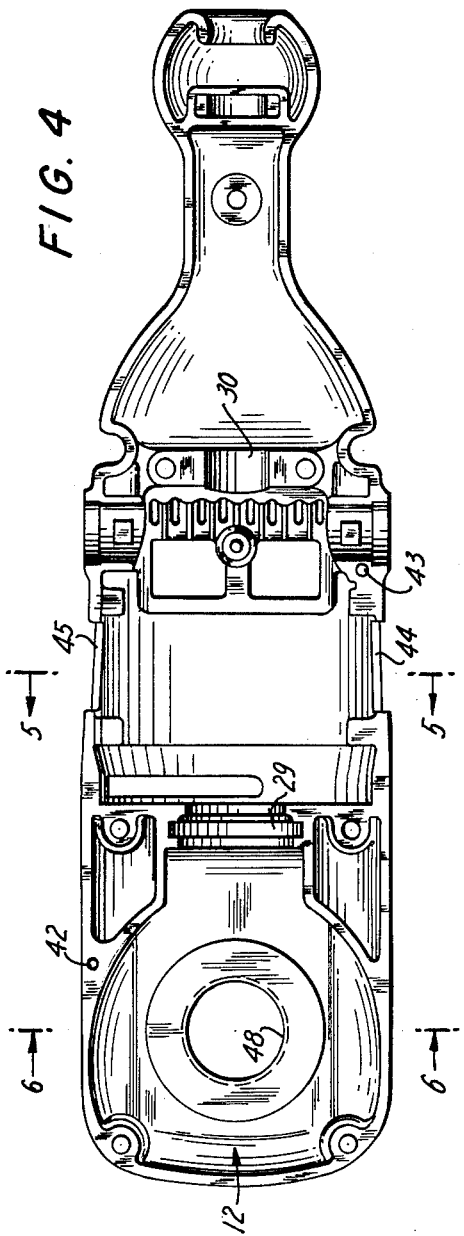

April 7, 1964  A. J. QUICK ETAL  3,127,795
BORING APPARATUS AND SPLIT-CASING WORKPIECE THEREFOR
Filed Aug. 8, 1960  6 Sheets-Sheet 4

INVENTORS
ADAM J. QUICK
CHARLES A. PORTER
BY
Leonard Bloom
ATTORNEY

April 7, 1964 A. J. QUICK ETAL 3,127,795
BORING APPARATUS AND SPLIT-CASING WORKPIECE THEREFOR
Filed Aug. 8, 1960 6 Sheets-Sheet 5

INVENTORS
ADAM J. QUICK
CHARLES A. PORTER
BY
*Leonard Bloom*
ATTORNEY

April 7, 1964 A. J. QUICK ETAL 3,127,795
BORING APPARATUS AND SPLIT-CASING WORKPIECE THEREFOR
Filed Aug. 8, 1960 6 Sheets-Sheet 6

INVENTORS
ADAM J. QUICK
CHARLES A. PORTER
BY
Leonard Bloom
ATTORNEY

United States Patent Office 3,127,795
Patented Apr. 7, 1964

3,127,795
BORING APPARATUS AND SPLIT-CASING
WORKPIECE THEREFOR
Adam J. Quick, Lutherville, and Charles A. Porter, Baltimore, Md., assignors to The Black and Decker Manufacturing Company, Towson, Md., a corporation of Maryland
Filed Aug. 8, 1960, Ser. No. 48,194
6 Claims. (Cl. 77—3)

The present invention relates to a boring apparatus for the machining of at least one internal bearing surface in a workpiece having at least one portion thereof in the form of a split-casing, and more particularly, to an apparatus for supporting a boring bar intermediate its ends by a suitable bearing, in combination with means in the split-casing to allow the bearing in turn to be supported externally of the workpiece.

In many areas of manufacture, such as those encountered in the portable electric tool industry, it has become quite economical and hence increasingly popular in recent years to manufacture various products in the form of a "clam shell" design, that is to say, the main housing for the product is in the form of a split-casing consisting of a pair of complementary or mating halves, which are usually die-cast from a suitable material such as aluminum. Invariably, each of these mating halves will include at least one semi-annular internal surface, such that when the mating halves are integrally joined together (as in the final assembly of the product) there will be formed an annular internal bearing surface; and indeed, such workpieces may include a plurality (usually a pair) of axially-spaced longitudinally-aligned internal bearing surfaces, which thus serve to house the necessary bearings that journal the conventional armature shaft.

These internal bearing surfaces must be properly machined, that is to say, bored to very accurate tolerances; and it is more economical to perform the boring operation simultaneously on both mating halves of the split-casing workpiece when they are integrally joined together. Usually, it is convenient to perform the boring operation by means of a suitable boring bar which is provided with at least one cutting tool secured therein. The boring bar is in turn chucked within the driving spindle of a suitable power-operated machine of the type having a power-actuated retractable work table, and the workpiece is provided with an open rear portion (usually the handle end of the workpiece) so as to allow the boring bar to pass therethrough.

If the workpiece (containing the internal bearing surface or surfaces to be bored) is relatively short in overall length, then the boring bar need not be supported beyond the driving spindle of the machine; or, on the other hand, if the workpiece is relatively long but has an open or accessible forward portion such that the forward extremity of the boring bar may extend beyond the workpiece, it is then possible to support the end of the boring bar (remote from the driving spindle) by a suitable bearing. Such a bearing support will prevent an end "sway" of the boring bar, which would otherwise generate inaccuracies in the boring operation.

Under certain circumstances, however, such as when the workpiece is relatively long in overall length and is provided with a closed forward portion, it is not possible (using conventional practices of the prior art) to provide a suitable bearing support for the boring bar remote from the driving spindle; and hence, if the aforementioned boring method is used, inaccuracies and misalignments will be generated in the internal bearing surfaces of the finished workpiece.

Accordingly, it is an object of the present invention to alleviate these difficulties by providing supporting means for the boring bar remote from the driving spindle.

It is a further object of the present invention to provide supplementary supporting means including a bearing for journaling the boring bar intermediate the ends thereof.

It is a still further object of the present invention to provide means within the split-casing workpiece to support the bearing externally of the workpiece.

It is another object of the present invention to provide a pair of supporting lugs for the bearing and to further provide a pair of respective openings within the split-casing workpiece to allow sufficient room for the supporting lugs to protrude therethrough.

It is yet another object of the present invention to provide fixture means for securely clamping both mating halves of the split-casing workpiece around the boring bar and supporting bearing therefor.

Other objects of the present invention will become apparent from the following description taken in conjunction with the enclosed drawings, in which:

FIGURE 2 is a longitudinal sectional view of the supporting means for the boring bar, showing the boring bar in full view, and further showing the interior of one of the mating halves of the split-casing working, which includes a view of the internal bearing surfaces to be machined;

FIGURE 3 is a sectional view taken along the lines 3—3 of FIGURE 2;

FIGURE 4 is a pictorial view of the interior of the other of the mating halves of the split-casing workpiece, showing the corresponding semi-annular axially-spaced aligned surfaces to be bored;

FIGURE 5 is a sectional view taken along the lines 5—5 of FIGURE 4;

FIGURE 6 is a sectional view taken along the lines 6—6 of FIGURE 4;

FIGURE 7 is a longitudinal sectional view taken along the lines 7—7 of FIGURE 2, and further showing both of the mating halves of the split-casing workpiece in assembled relationship to each other, and confining therein the boring bar and the supporting means therefor;

Figure 1:
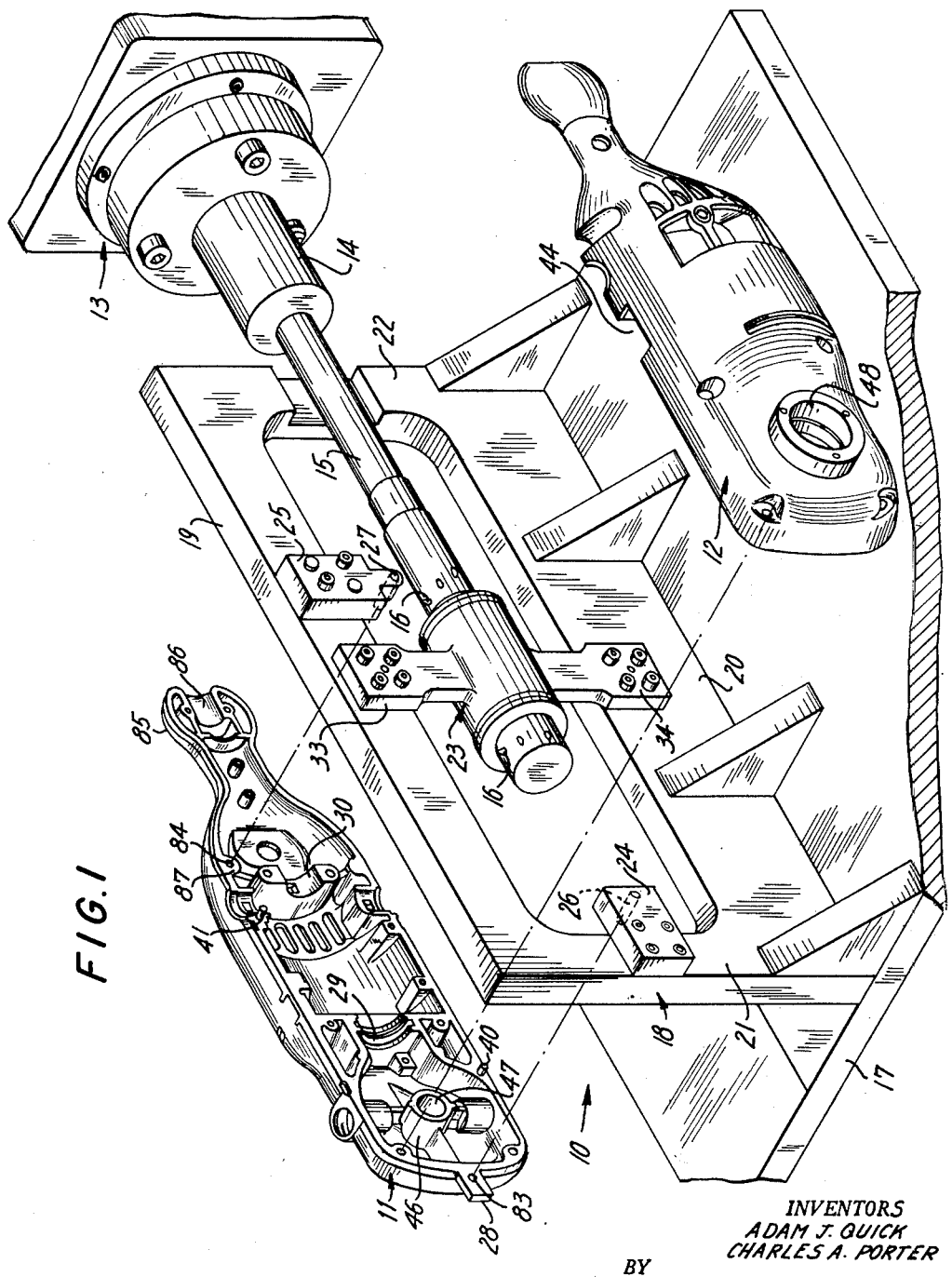
FIGURE 1 is a perspective view showing a portion of the boring apparatus, and fixture means thereof, and further showing each of the mating halves of the split-casing workpiece in exploded relationship to the boring apparatus.

With particular reference to FIGURE 1, there is illustrated the basic elements of the fixture means 10, together with the mating halves 11 and 12 of the split-casing workpiece in an exploded relationship to the fixture means 10. The mating halves 11 and 12 of the split-casing workpiece are shown in a form convenient for the manufacture of a portable electric sander or polisher of the rotary type; but it is to be understood, of course, that the scope of the present invention is not necessarily confined thereto, but on the contrary is applicable to a wide variety of tools, appliances, and various products using the split-casing type of design. Moreover, it will be understood that the terms "split-casing workpiece" (as herein applied) is not necessarily to be confined to a workpiece having precise mating halves, that is to say, a workpiece split by a single plane passing through its longitudinal axis, but on the contrary, contemplates all forms of workpieces in which at least a portion thereof comprises a pair of disconnectable sections (which when joined together) form a completed workpiece.

There is further illustrated (in FIGURE 1) a portion of a power-operated boring machine, indicated generally at 13, and provided with a driving spindle 14. A conventional boring bar 15 is suitably chucked within the driving spindle 14 and is provided with a plurality of cutting tools 16 secured therein. The fixture means 10 includes a base 17 to which is secured an upright frame 18 having top and bottom horizontal members 19 and 20, respectively, and further having vertical side members 21 and 22, respectively. It will be appreciated that the mating halves 11 and 12 of the split-casing workpiece (when joined together) will have a main portion including the internal bearing surfaces to be bored (as hereinafter explained in detail); and the workpiece will further have a rear handle portion 85 including an axially-aligned opening 86 through which the boring bar 15 may protrude.

The boring bar 15 is supported remote from the driving spindle 14 by suitable supporting means, indicated generally at 23, which is in turn secured to the top and bottom horizontal members 19 and 20 of the frame 18. Means (hereinafter to be described in detail) are then provided to integrally join the mating halves 11 and 12 together and to securely clamp them within the fixture means 10 such that the supporting means 23 is partially confined within the split-casing workpiece.

With reference to FIGURES 1, 2, and 3, one of the mating halves 11 of the split-casing workpiece is first positioned within the fixture means 10 by means of a plurality of locating pads, such as the pair of locating pads denoted by 24 and 25, which have suitable transversely-disposed dowel pins 26 and 27, respectively, secured therein and adapted to engage corresponding mounting holes 83 and 84, respectively, formed in one of the mating halves 11. It will be appreciated from an examination of the drawings, particularly FIGURE 1, that locating pad 24 is secured to vertical side rail 21 of frame 18, and that locating pad 25 is secured to horizontal side rail 19 of frame 18. Pneumatically-actuated means, hereinafter to be described in detail, are then used to securely clamp mating half 11 with the fixture means 10. One of the mounting holes, namely 83, is formed within an integral tab 28, which afterwards may be removed by any convenient method; and the other mounting hole, namely 84, is formed within a boss 87.

As shown in FIGURE 2, the interior of the mating half 11 is provided with a pair of aligned axially-spaced internal bearing surfaces 29 and 30, respectively, which in mating half 11 consists of a pair of semi-annular (or semi-cylindrical) surfaces to be suitably machined by the boring bar 15. As shown in FIGURES 2 and 3, the supporting means 23 comprises a bearing yoke 31 having a main sleeve portion 32 and further having a pair of integral supporting lugs 33 and 34, which are disposed oppositely from each other and which project outwardly of the main sleeve portion 32 to be secured (as shown in FIGURE 1) to the top and bottom horizontal members 19 and 20, respectively, of the frame 18. As shown particularly in FIGURE 1, supporting lug 33 is adjacent to locating pad 25. As shown in FIGURE 2, the supporting means 23 includes a pair of roller bearings, 35 and 36, for journalling the boring bar 15 within the supporting means 23; and means consisting of a suitable seal 37, washer 38, and screws 39 are used to retain the roller bearings 35 and 36 within the bearing yoke 31.

The mating half 11 is further provided with a pair of integral auxiliary dowel pins 40 and 41 (see FIGURES 1 and 2), which engage a pair of corresponding positioning holes 42 and 43, respectively, formed in the other of the mating halves 12 (see FIGURE 4) when mating half 12 is integrally joined with mating half 11 and positioned within the fixture means 10. It will be appreciated from an examination of the drawings, that the auxiliary dowel pins 40 and 41 are located on opposite sides of the longitudinal axis of mating half 11 and are laterally transposed with respect to each other. Pneumatically-actuated means, hereinafter to be described in detail, are also provided to securely clamp mating half 12 within the fixture means 10.

As shown in FIGURES 1, 4, and 5, mating half 12 is provided with a pair of cut-outs or openings 44 and 45, which for convenience are illustrated as generally rectangular in outline, and which provide sufficient room for the supporting lugs 33 and 34, respectively, to protrude therethrough in order that the bearing yoke 31 may be supported externally of the workpiece. It will be appreciated, of course, that the particular configuration of cut-outs 44 and 45 is merely a preferred embodiment of the teachings of the present invention, and that the essence of the present invention is not necessarily to be confined thereto. Moreover, it will be further appreciated that in the finished product, suitable inserts (such as may be molded from plastic) may be provided to enclose the cut-outs 44 and 45.

As shown in FIGURES 2 and 7, mating half 11 is further provided with a transverse boss 46 which includes a blind axial bore 47; and as shown in FIGURES 4, 6, and 7, the other of the mating halves, namely 12, is provided with a transverse opening 48 which serves as a bearing surface for the ultimate support of the conventional main spindle bearing in the finished product.

Figure 8:
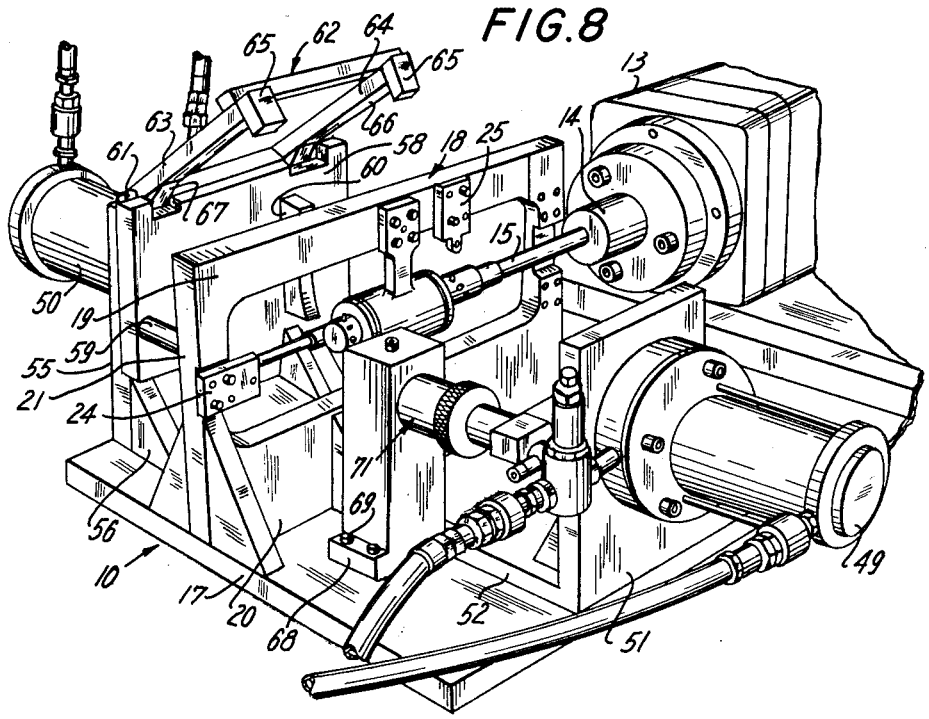
FIGURE 8 is a perspective view of the boring apparatus, showing the complete fixture means thereof in position for loading the workpiece therein.
Figure 9:
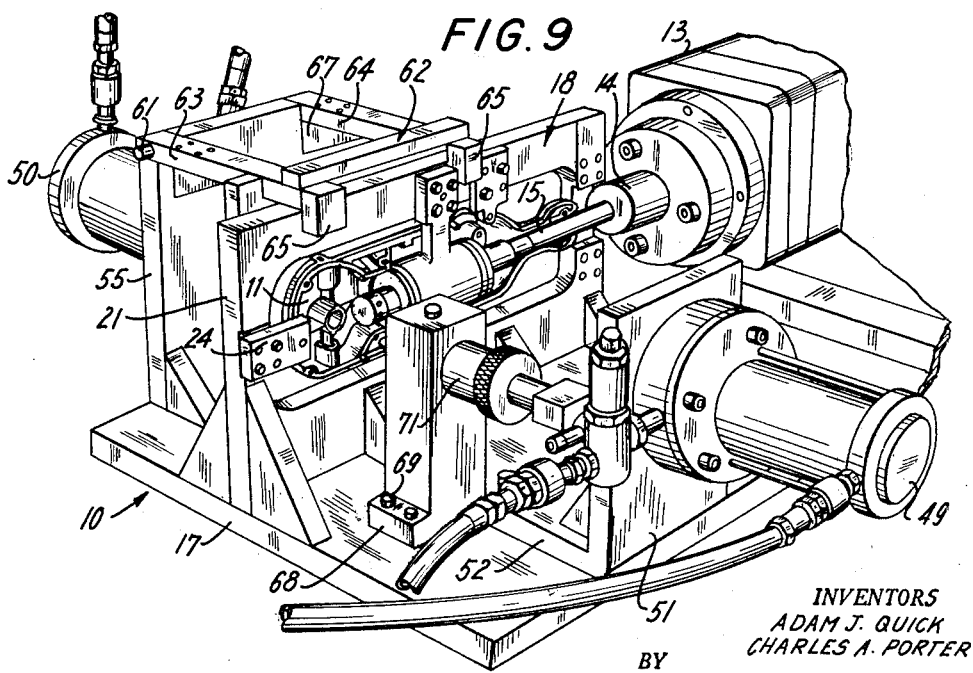
FIGURE 9 is a corresponding perspective view of the boring apparatus in the succeeding stage, showing one of the mating halves of the split-casing workpiece securely clamped within the fixture means.
Figure 10:
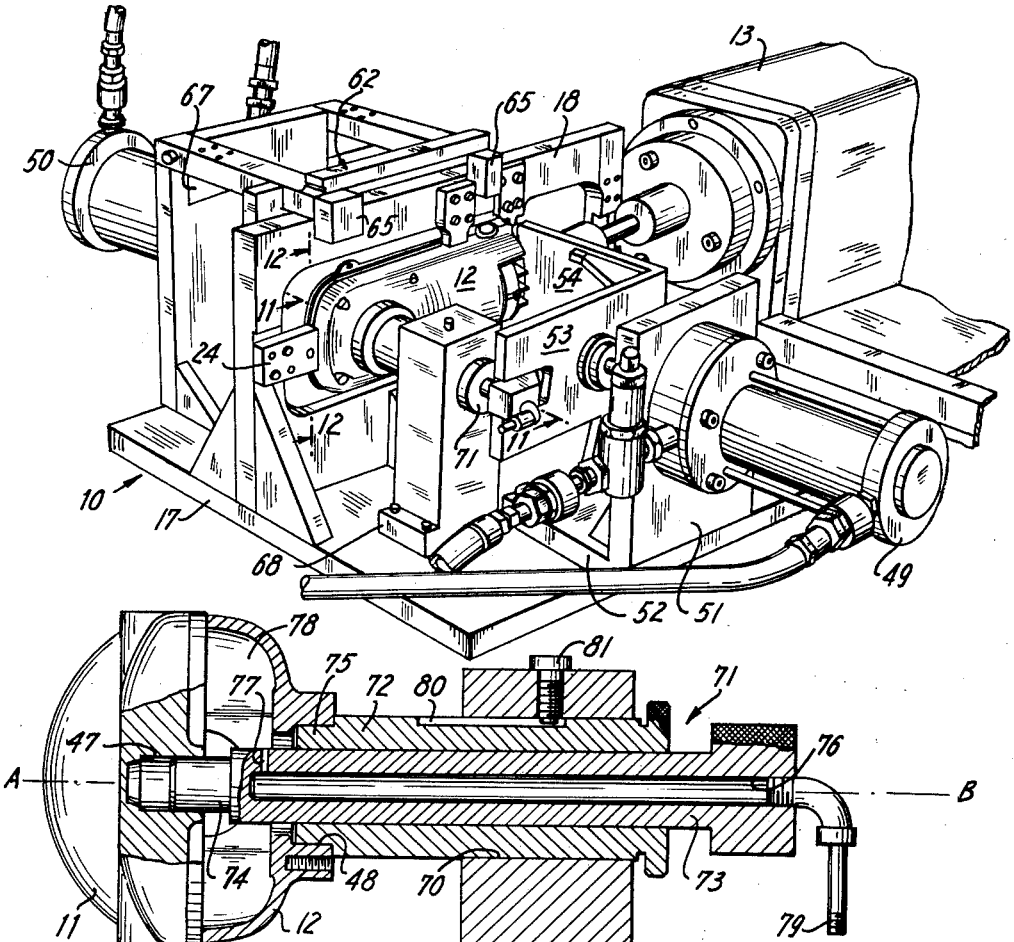
FIGURE 10 is another corresponding perspective view of the boring apparatus in the final stage, showing both of the mating halves of the split-casing workpiece integrally joined together around the boring bar and securely clamped within the fixture means.

With reference to FIGURES 8, 9, and 10, there is illustrated the successive stages in the loading of the mating halves 11 and 12 within the fixture means 10. First, one of the mating halves, namely 11, is clamped securely within the fixture means 10, as shown in FIGURE 9; and then the other of the mating halves, namely 12, is clamped securely in place, as shown in FIGURE 10. Pneumatically-actuated clamping means including conventional air cylinders 49 and 50 are used to clamp mating halves 12 and 11, respectively, within the fixture means 10. Air cylinder 49 may be mounted (with its axis transverse to the longitudinal axis of boring bar 15) within a suitable mounting hole (not shown) formed in the vertical supporting member 51 of an L-shaped supporting bracket 52, which is secured to the base 17 of the fixture means 10 by any suitable method. Air cylinder 49 is provided with a conventional piston (not shown) as well as suitable swivel means (which being conventional, are likewise omitted) for connecting the piston with an L-shaped clamping bracket 53 (see FIGURE 10); and clamping bracket 53 includes a forwardly-extending clamping member 54 used to engage mating half 12 and hold it securely in place.

As shown in FIGURES 8, 9, 10, and 12, the other of the air cylinders, namely 50, is similarly mounted upon the fixture means 10 by means of a vertical supporting member 55 secured to base 17 by suitable wedges, one of which is indicated at 56. It will be appreciated that air cylinder 50 includes a suitable piston (partially shown as at 57 in FIGURE 12) as well as swivel means, which being conventional, is herein omitted for ease of illustration.

Figure 12:
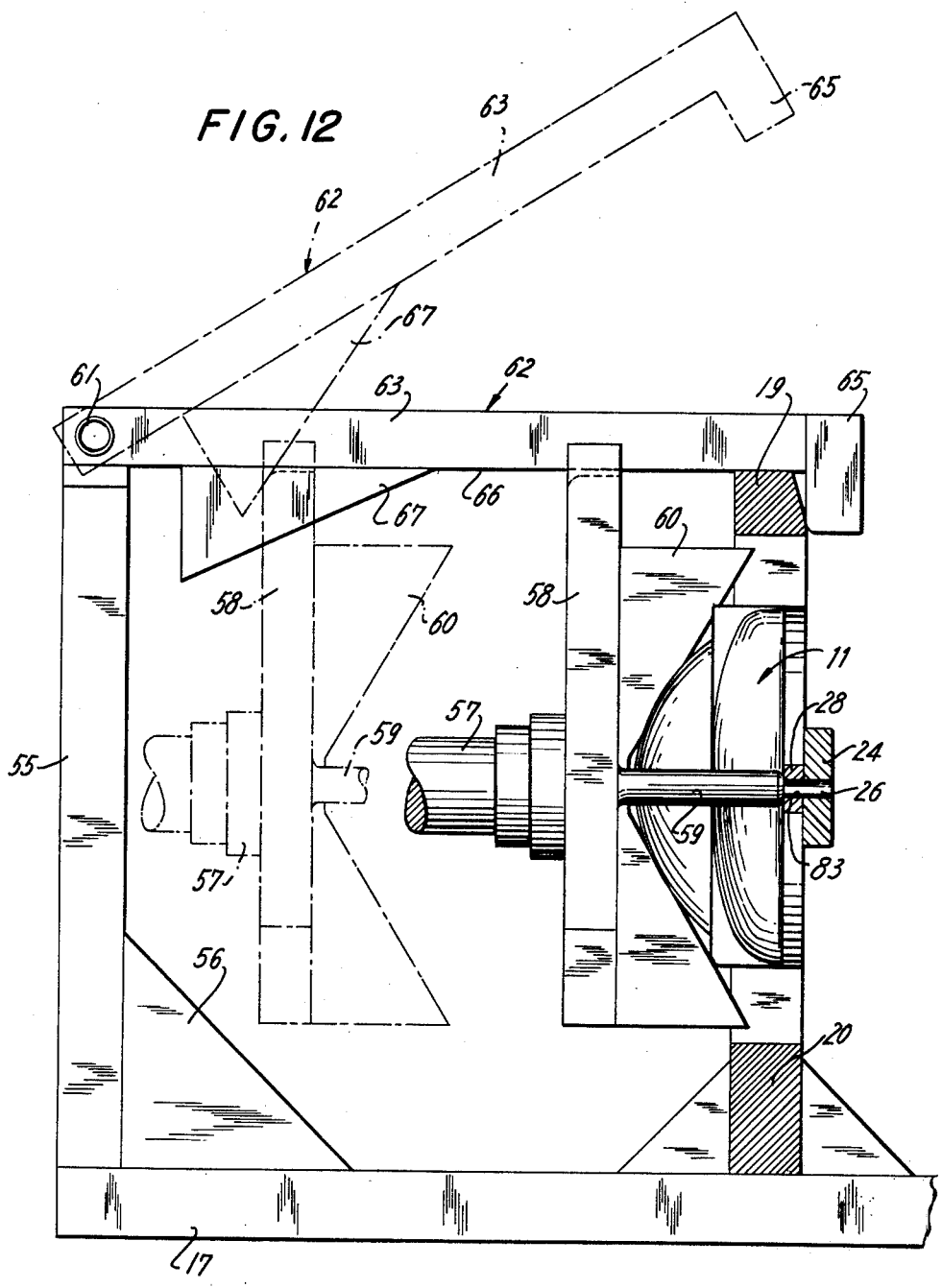
FIGURE 12 is a partial sectional view taken along the lines 12—12 of FIGURE 10, showing the operation of one of the pneumatic cylinders, clamping bracket, and overhead brace.

As shown more particularly in FIGURE 12, the air cylinder 50 (via piston 57) actuates a clamping member 58, which includes a forwardly-extending clamping pin 59 adapted to engage the tab 28 of mating half 11, and which further includes a forwardly-extending V-shaped clamp 60 (shown partially in FIGURE 12) adapted to engage the mating half 11 intermediate the extremities thereof. The vertical supporting member 55 is provided with a top portion including a pivot pin 61 having a longitudinal axis which is parallel to the longitudinal axis of the boring bar 15, and an overhead brace 62 is pivotably-secured to the top portion of the vertical supporting member 55 and is allowed to have a limited pivoting movement about pin 61. The overhead brace 62 includes a pair of parallel side members 63 and 64 (see FIGURE 9) cantilevered from the vertical supporting member 55 towards frame 18, and each of the side members 63 and 64 is provided with an integral downwardly-projecting lug 65 as well as a suitable under surface 66 to which is secured a suitable wedge 67. Wedge 67 normally engages the top of clamping member 58 to hold overhead brace 62 in its retracted position as indicated by the phantom lines of FIGURE 12.

Hence, it will be appreciated that as air cylinder 50 is actuated, piston 57 and clamping member 58 will be moved forwardly from the "off" position shown by the phantom lines of FIGURE 12 such that clamping pin 59 and V-shaped clamp 60 will hold mating half 11 within the fixture means 10; and at the same time, wedge 67 will be disengaged from clamping member 28 to allow overhead brace 62 to fall downwardly by its own weight and around pivoting pin 61, such that lug 65 engages the side of the top horizontal member 19 of frame 18 as shown in FIGURE 12. Ideally, overhead brace 62 engages frame 18 (in such a manner) just previously to the instant that clamping member 58 (that is, clamping pin 59 and V-shaped clamp 60) engages casting 11, thus providing a suitable bracing means which will preclude frame 18 from buckling under the repeated load supplied from the pneumatically-actuated clamping means.

Means are further provided to accurately gauge the position of the workpiece with respect to the boring bar 15. As shown in FIGURES 8 through 10, and more particularly in sectional view in FIGURE 11, a locating block 68 is secured to the base 17 as by bolts 69; and locating block 68 is provided with a transverse bore 70, which receives a manually-actuated locating plunger assembly 71 guided for a limited reciprocation with respect to the locating block 68. This locating plunger assembly 71 has a longitudinal axis A—B (see FIGURE 12) which is coincident with both the blind axial bore 47 in mating half 11 and the bearing surface formed by the transverse opening 48 in mating half 12. Moreover, in the fabrication of the fixture means 10, it will be appreciated that the vertical distance between the longitudinal axis A—B of the locating plunger assembly 71 and the base 17 of the fixture means 10 is very accurately predetermined to correspond to the vertical distance between the longitudinal axis of the boring bar 15 and the base 17, thus assuring that mating halves 11 and 12, that is to say, the internal bearing surfaces 29 and 30, will be accurately aligned to very close tolerances and will not be skewed with respect to each other. Hence, in the finished product, the main spindle (to be journaled within bearings in transverse opening 48) will be accurately aligned with the armature pinion, the latter being guided via internal bearing surfaces 29 and 30.

Figure 11:
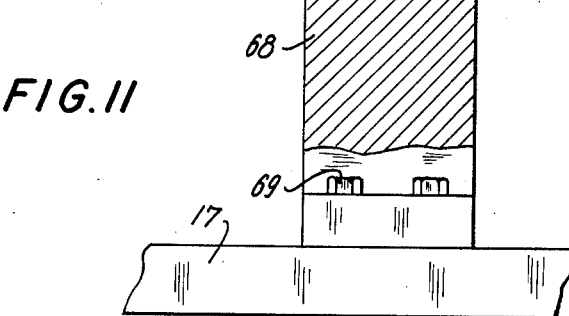
FIGURE 11 is a longitudinal sectional view of the locating block portion of the fixture means, showing the locating plunger assembly in relationship to the forward portions of the split-casing workpiece.

As shown in FIGURE 11, the locating plunger assembly 71 has an outer sleeve 72 guided for reciprocation within the transverse bore 70 of the locating block 68; and an inner plunger 73 (guided for reciprocation within outer sleeve 72) has a forwardmost portion 74 thereof adapted to seat within the blind axial bore 47 of mating half 11. Likewise, the outer sleeve 72 has a forwardmost portion 75 thereof which is adapted to seat within the bearing surface formed by transverse opening 48 of mating half 12. Moreover, inner plunger 73 is provided with a longitudinal bore 76, which by means of at least one radial canal 77, interconnects the interior 78 of the split-casing workpiece with a suitable fitting 79; and in such a manner, a suitable lubricant may be provided for the boring bar 15. Furthermore, outer sleeve 72 is provided with slot 80 which is adapted to engage screw 81 for limiting the amount of reciprocation of outer sleeve 72.

As shown in FIGURES 8 and 9, the locating plunger assembly 71 is retracted to enable the mating halves 11 and 12 of the split-casing workpiece to be loaded within the fixture means 10; and then, as shown in FIGURE 10, the locating plunger assembly 71 has been advanced (preferably by a manual actuation, but not necessarily so) to engage and locate the workpiece in the manner previously described.

The fixture means 10 (in the preferred embodiment illustrated herein) is adapted to be retracted (or moved away) from the driving spindle 14 (and boring bar 15) by power-actuated means, which being conventional, are herein omitted for ease of illustration.

It is seen that the present invention fulfills a need for a convenient boring apparatus and split-casing workpiece therefor, which will save considerable time in a key manufacturing step, and which will provide a finished product having internal bearing surfaces machined to a very close tolerance and being very accurately aligned.

Obviously, many modifications may be made without departing from the basic spirit of the present invention; and therefore, within the scope of the appended claims, the invention may be practiced other than has been specifically described.

We claim:

1. Apparatus for the simultaneous boring of a pair of axially-spaced aligned internal bearing surfaces in a split-casing workpiece of the type having a pair of complementary mating halves, one of which is provided with a pair of diametrically-opposite openings, said boring apparatus comprising a power-operated machine provided with a driving spindle, a boring bar chucked within said driving spindle, said boring bar having a longitudinal axis and further having a pair of cutting tools mounted therein, a fixture including a base and further including a rigid upright frame secured to said base transversely thereof, said boring bar being disposed substantially within said frame, said frame having a pair of horizontal side rails and further having a pair of vertical side rails, supporting means including a pair of roller bearings to journal said boring bar remote from said driving spindle, said supporting means being disposed intermediate said pair of cutting tools mounted in said boring bar, a pair of supporting lugs secured to said supporting means and projecting radially therefrom, one on each side of said boring bar, and secured to respective horizontal side rails of said frame, means to securely clamp first one and then the other of said mating halves of said split-casing workpiece within said frame, whereby said supporting lugs project through the respective openings in said one of the mating halves, and means to accurately gauge the position of said workpiece with respect to said boring bar.

2. Apparatus as defined in claim 1, wherein said means to securely clamp first one and then the other of said mating halves of said split-casing workpiece within said frame of said fixture, comprises, a plurality of locating pads secured around said frame and projecting inwardly therefrom towards said boring bar, means to mount one of said mating halves of said split-casing workpiece upon said locating pads, pneumatically-actuated clamping means to securely clamp said one of said mating halves upon said locating pads, means to then mount the other of said mating halves upon said one of said mating halves of said split-casing workpiece, whereby said mating halves are integrally joined together within said fixture, and pneumatically-actuated clamping means to then securely clamp said other of said mating halves of said split-casing workpiece within said fixture.

3. Apparatus as defined in claim 2, wherein said locating pads are provided with inwardly-projecting portions having transversely-disposed dowel pins secured therein, and wherein said means to mount said one of said mating halves of said split-casing workpiece upon said locating pads comprises a plurality of holes formed in said one of said mating halves and adapted to engage said dowel pins in said mounting lugs.

4. Apparatus as defined in claim 1, wherein said means to accurately gauge the position of said workpiece with respect to said boring bar, comprises, said one of said mating halves of said split-casing workpiece having a forward portion being provided with a transverse boss including a blind axial bore, said other of said mating halves of said split-casing workpiece having a corresponding forward portion being provided with a transverse opening including a bearing surface, and a locating block secured to said base of said fixture, said locating block being provided with a transverse bore and further being provided with a manually-actuated locating plunger assembly guided for limited reciprocation in said transverse bore of said locating block, said locating plunger assembly having a longitudinal axis coincident with said blind axial bore in said one of said mating halves and further coincident with said bearing surface in said other of said mating halves, and the vertical distance between said longitudinal axis of said locating plunger assembly and said base of said fixture being very accurately predetermined to correspond to the vertical distance between said longitudinal axis of said boring bar and said base of said fixture.

5. Apparatus as defined in claim 4, wherein said locating plunger assembly comprises, an outer sleeve guided for reciprocation within said transverse bore of said locating block, means to limit the amount of reciprocation of said sleeve, an inner plunger guided for reciprocation within said outer sleeve, said inner plunger having a forwardmost portion thereof adapted to seat within said blind axial bore in said transverse boss of said one of said mating halves of said split-casing workpiece, said outer sleeve having a forwardmost portion thereof adapted to seat within said bearing surface in said transverse opening of said other of said mating halves of said split-casing workpiece.

6. Apparatus for boring an internal bearing surface in a split-casing workpiece of the type having a pair of complementary mating halves adapted to be joined together along a common longitudinal midplane, wherein one of the halves is provided with an opening communicating with the longitudinal midplane, said boring apparatus comprising a boring bar rotatable about its longitudinal axis, a fixture including an outboard bearing for journaling said boring bar and further including a supporting lug secured to said bearing and projecting radially therefrom, and means to clamp first one and then the other of said mating halves within said fixture, whereby said supporting lug projects through the opening in said one of the mating halves, and whereby the longitudinal axis of the said boring bar is substantially aligned with the common longitudinal midplane between the mating halves of the split-casing workpiece.

References Cited in the file of this patent
UNITED STATES PATENTS

| | | |
|---|---|---|
| 1,284,456 | Richards et al. | Nov. 12, 1918 |
| 2,085,397 | Strachan | June 29, 1937 |
| 2,507,504 | Cudini | May 16, 1950 |
| 2,525,839 | Sparklin | Oct. 17, 1950 |
| 2,612,064 | Arp | Sept. 30, 1952 |
| 2,829,285 | Steiner | Apr. 1, 1958 |
| 2,867,138 | Kendall | Jan. 6, 1959 |
| 2,877,671 | Rutherford | Mar. 17, 1959 |
| 2,964,978 | Alafouzos | Dec. 20, 1960 |